United States Patent [19]

Iwasaki

[11] 4,339,955
[45] Jul. 20, 1982

[54] PRESSURE SENSOR

[75] Inventor: Shinichiro Iwasaki, Auburn Heights, Mich.

[73] Assignee: Aisin Seiki Company, Ltd., Kariya, Japan

[21] Appl. No.: 182,841

[22] Filed: Aug. 29, 1980

[51] Int. Cl.³ .............................................. G01L 9/10
[52] U.S. Cl. ...................................... 73/728; 336/110
[58] Field of Search ................ 73/717, 722, 723, 728; 324/207, 208; 323/362; 336/30, 110

[56] References Cited

U.S. PATENT DOCUMENTS 3,877,314  4/1975  Bernin ............................... 73/517 B
4,006,402  2/1977  Mincuzzi .......................... 73/722 X

FOREIGN PATENT DOCUMENTS 2403744  8/1974  Fed. Rep. of Germany ...... 324/208
46-23674  8/1971  Japan ................................. 324/208

OTHER PUBLICATIONS

"Force and Displacement Transducers . . . ", by Mohri et al., from *Electrical Engineering in Japan*, vol. 99, No. 2, pp. 105-112, Feb. 1979.

*Primary Examiner*—James J. Gill
*Attorney, Agent, or Firm*—Oblon, Fisher, Spivak, McClelland & Maier

[57] ABSTRACT

A pressure sensor comprising a pressure-displacement translating mechanism including a movable body driven by a hydraulic pressure and a spring for urging the movable body in a direction opposite the pressure, and a displacement-pulse phase conversion unit including a permanent magnet secured to the movable body and a magnetically soft member carrying an electrical coil thereon and disposed at a stationary point adjacent to the region of movement of the permanent magnet. A pulse voltage is applied to one end of the electrical coil, the other end of which is connected in series with a resistor. A voltage drop across the resistor is detected, and a time lag of the voltage drop with respect to the pulse voltage, representing a measure of hydraulic pressure, is provided in the form of an analog voltage or a digital code.

13 Claims, 31 Drawing Figures

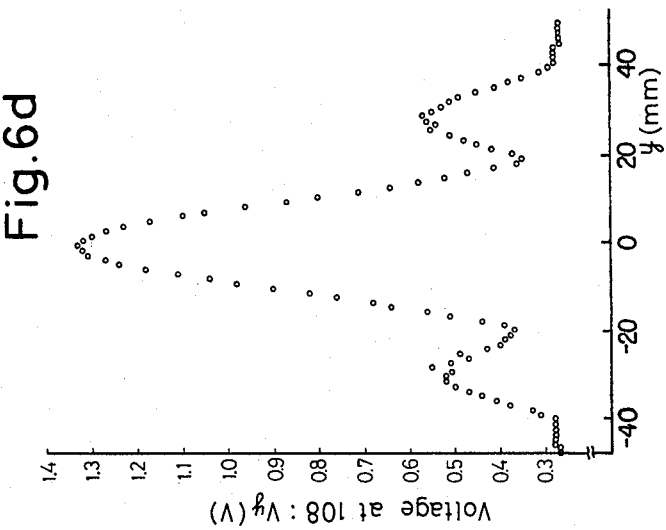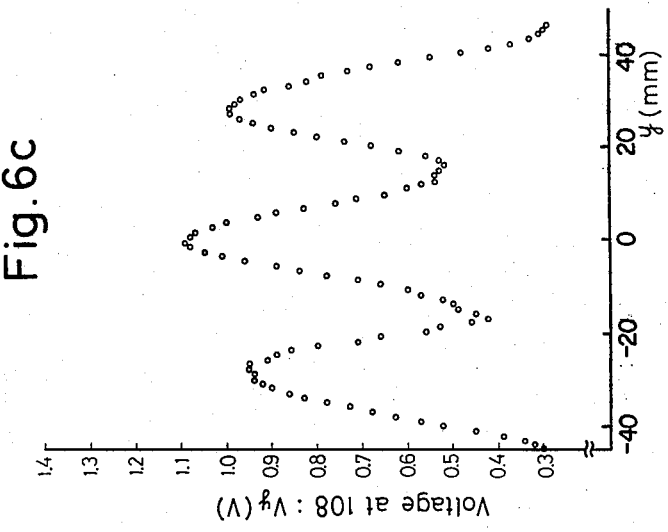

PRESSURE SENSOR

BACKGROUND OF THE INVENTION

1. Field of the Invention

The invention relates to a pressure sensor which translates a hydraulic pressure into an electrical signal, and more particularly, to a pressure sensor of the type including a movable body which is subjected to a hydraulic pressure causing a displacement which is converted into an electrical signal.

2. Discussion of the Prior Art

A conventional arrangement is known in which a diaphragm is subject to hydraulic pressure and is normally urged by a coiled spring to oppose the hydraulic pressure, with the diaphragm being connected to a slider on a potentiometer. In this arrangement, the potentiometer provides an analog voltage corresponding to the amount of movement of the diaphragm when the latter is subjected to hydraulic pressure. With this pressure sensor, it is desirable that a thin film resistor forming the potentiometer exhibits a high abrasion resistance and provides a stable output voltage for a given slider position. It is also desired that the movable body and the slider be mechanically connected together with a minimal degree of rattling and that a stabilized contact is maintained between the slider and the thin film resistor in the presence of oscillations or shocks. However, because the slider is brought into contact with the thin film resistor under pressure, an abrasion or oscillations may cause an unstabilized output voltage to be produced in respect to the measured hydraulic pressure.

SUMMARY OF THE INVENTION

Accordingly, one object of this invention is to provide a novel pressure sensor including non-contact pressure conversion means in which no mechanical contact mechanism is involved in the mechanical-to-electrical conversion system which converts a mechanical displacement into a corresponding electrical signal.

A further object of the invention is to provide a novel solid pressure sensor having a high resistance to oscillations and shocks.

Yet another object of the invention is to provide a novel pressure sensor which requires only a relatively simple processing of a pressure detection signal.

Still another object of the invention is to provide a novel pressure sensor capable of providing a pressure data read-out with relatively simple read-out logic in the form of a large scale integrated circuit such as microcomputer which has been the subject of great advances recently.

These and other objects are achieved according to the invention by providing a novel pressure sensor including a casing having an internal space divided by a movable body into a first space into which a hydraulic pressure to be determined is supplied and a second space through which a fluid, normally air, of a given pressure, normally atmospheric pressure, is confined or passes. A magnetically soft material exhibiting high permeability ($\mu_{max} > 10^3$) and low coercive force ($< 1.0$ Oe) and having an electric coil disposed thereon is arranged in one of the spaces, and a permanent magnet is arranged adjacent to the magnetically soft member and is fixedly mounted on the movable body. (Some magnetically soft materials are described in Hasegawa et al, "Soft Magnetic Properties of Metallic Glasses—Recent Developments", J. Appl. Phys. 50(3), March, 1979, pp. 1551–1556. Magnetically soft materials are sold under the trademark METGLAS (TM) by Allied Chemical Corp.) In one or more embodiments, spring means is received in the first space and acts in a direction to compress the volume of the second space while the magnetically soft member carrying the electric coil is disposed in the second space, with the permanent magnet being secured to the free end of a rod-shaped extension of the movable body which projects into the second space. In another or additional embodiments, the magnetically soft member carrying the electrical coil thereon, as well as spring means which urge the movable body in a direction to compress the volume of the first space, are disposed in the second space, and the permanent magnet is secured to the free end of a rod-shaped extension of the movable body which projects into the second space. The magnetically soft member has a transverse cross section of a reduced magnitude so that magnetic saturation is easily achieved. The electrical coil has an increased number of turns so that the magnetically soft member can be magnetically saturated with a relatively low voltage applied or at a relatively low current level. The permanent magnet is physically reduced while being compatible with providing to the magnetically soft member a magnetic field of a magnitude which depends on the travel within its predetermined extent of movement.

A time T required for the magnetically soft member to saturate from the instant of application of a voltage to a coil disposed on the member can be expressed approximately as follows:

$$T = \frac{N}{E}(\phi_m - \phi_x) \tag{1}$$

where E represents the voltage applied, N the number of turns in the coil, $\phi_m$ the maximum flux which is approximately equivalent to the saturation flux and $\phi_x$ a flux attributable to an external magnetic field. As the magnitude of $\phi_x$ which is applied to the magnetically soft member changes in response to a movement of the permanent magnet, the value of T also changes. In this manner, as the permanent magnet is displaced in response to a hydraulic pressure to cause a change in the external flux $\phi_x$ applied to the magnetically soft member, the length of time T from the application of a voltage to the coil until the coil current reaches a given level changes. Accordingly, in the pressure sensor of the invention, an electrical circuit or a semiconductor electronic device is provided which determines the value of T and provides an electrical signal in the form of a voltage level or a digital code indicative of such value.

In a preferred embodiment of the invention, an amorphous magnetic material is used to form the magnetically soft member. Since an amorphous magnetic member must be manufactured by quenching from a liquid phase metal, it is formed as a thin sheet. It exhibits a ferromagnetism and has a high level of magnetic saturation, high permeability and a low coercive force while exhibiting a very high breaking strength and an excellent resiliency and stability. Such properties of an amorphous material are very preferred for use in the pressure sensor of this invention. Its use advantageously facilitates signal processing and increases the accuracy in the determination of the value of T. In addition, in mechanical aspects, the manufacturing is simplified while improving the resistance to oscillations or shocks.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2b is a graph illustrating the waveforms of input and output signals to and from the processing circuit shown in FIG. 2a;

FIG. 3b is a graph illustrating the waveforms of input and output signals of the processing circuit shown in FIG. 3a;

FIG. 6b is a graph illustrating voltage data indicative of the time lag which varies in accordance with the travel y of a 10 mm long permanent magnet in the Y—Y direction utilizing the arrangement illustrated in FIG. 6a and when the electrical coil is connected to the electrical processing circuit shown in FIG. 2a, the pulse voltage applied to the electrical coil being such that an S-pole is produced at the upper end of the magnetically soft member as viewed in FIG. 6a;

FIG. 6c is a graph illustrating corresponding data for a 30 mm long permanent magnet;

FIG. 6d is a graph illustrating data for a 30 mm long permanent magnet and corresponding to that shown in FIG. 6b when a pulse voltage is applied to the electrical coil with a polarity such that an N-pole is produced at the upper end of the magnetically soft member as viewed in FIG. 6a;

FIG. 8a is a graph illustrating voltage data indicative of the time lag which varies in accordance with the travel x of a 10 mm long permanent magnet in the X—X direction utilizing the arrangement shown in FIG. 6a with the electrical coil connected to the electrical processing circuit shown in FIG. 2a, a pulse voltage being applied to the electrical coil with a polarity such that an S-pole is produced at the upper end of the magnetically soft member as viewed in FIG. 6a;

FIG. 8b is a graph illustrating time lag data when the coil is connected to the electrical processing circuit shown in FIG. 3a, with an input and output pulse being applied to a synchroscope, utilizing the arrangement shown in FIG. 6a and moving the permanent magnet in the X—X direction, a pulse voltage applied to the electrical coil being such that an S-pole is produced at the upper end of the magnetically soft member, as viewed in FIG. 6a;

FIG. 8c is a graph illustrating data corresponding to FIG. 8a when a pulse voltage is applied to the electrical coil with such polarity that an N-pole is produced at the upper end of the magnetically soft member, as viewed in FIG. 6a;

FIG. 8d is a graph illustrating data corresponding to FIG. 8b when a pulse voltage is applied to the electrical coil with such polarity that an N-pole is produced at the upper end of the magnetically soft member, as viewed in FIG. 6a;

FIG. 11b is a graph illustrating voltage data indicative of a time lag which varies in accordance with the travel x of a 30 mm long permanent magnet in the X—X direction, utilizing the arrangement shown in FIG. 11a and a pair of electrical coils spaced apart by 35 mm and connected to the electrical processing circuit shown in FIG. 10, a pulse voltage being applied to the electrical coils with a polarity such that an S-pole is produced at the upper end of the respective magnetically soft members, as viewed in FIG. 11a;

FIG. 11c is a graph illustrating data corresponding to FIG. 11a when a pulse voltage is applied to the electrical coils with polarity such that an N-pole is produced at the upper end of the respective magnetically soft members, as viewed in FIG. 11a;

DESCRIPTION OF THE PREFERRED EMBODIMENTS

Figure 1:
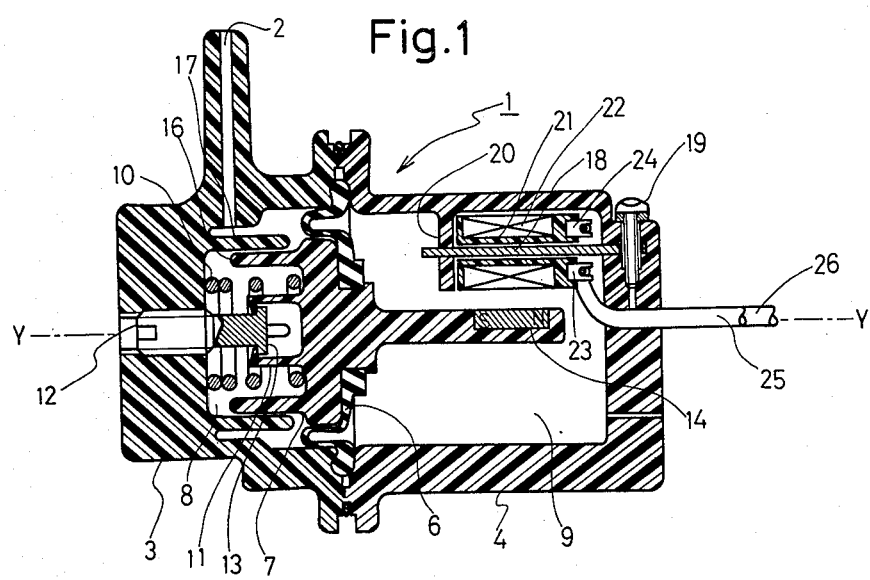
FIG. 1 is a longitudinal cross-sectional view of a pressure sensor according to one embodiment of the invention.

Referring now to the drawings, wherein like reference numerals designate identical or corresponding parts throughout the several views, and more particularly to FIG. 1 thereof, there is shown a pressure sensor 1 including a first body 3 formed of resin material and having an inlet 2 into which a negative pressure prevailing in the intake manifold of an engine mounted on a vehicle is introduced, and a second body 4 also formed of resin material and joined to the body 3 by ultrasonic welding. A diaphragm 6 has its periphery held between the first and the second bodies 3, 4, and includes a central flat portion, through which a permanent magnet holder 7 extends and is secured thereto. The combination of the diaphragm 6 and the holder 7 divides the internal space defined by the first and the second bodies 3, 4, into a first inner space 8 communicating with the inlet 2 and a second inner space 9 communicating with the atmosphere. The holder 7 is normally urged by a coiled compression spring 10, disposed within the first inner space 8, in a direction to reduce the second inner space 9 or to the right, as viewed in FIG. 1. Hence, when the atmospheric pressure prevails in the first space 8, a hook 11 formed on the free end of a tubular extension from the back of the holder 7 bears against a flange 13 formed on the shank of a screw 12 which is threadably engaged with the first body 3 (see FIG. 1). It will be appreciated that the screw 12 can move toward or away from the diaphragm 6 as it is turned. This means that a movement of the holder 7 to the right is constrained at a location by the screw 12, which point is adjusted by turning the screw 12. On its front side, the holder has a rod-shaped projection, on the free end of which a permanent magnet 14 is secured. On its back side, the holder 7 is formed with an annular projection 16 which is fitted into an annular ring 17 projecting from the first body 3. In this manner, the ring 17 guides the holder 7 for its axial movement. A magnetically soft member 18 is disposed in parallel relationship with the permanent magnet 14 within the second inner space 9, and has its one end secured to the body by means of a screw 19 and its other end supported by an extension 20 from the body 4. The magnetically soft member 18 extends through a bobbin 21 on which an electrical coil 22 is disposed. The opposite ends of the coil 22 are connected through terminals 23, 24 to a pair of leads 25, 26. When a negative pressure of a magnitude exceeding a given value is applied to the first space 8 through the inlet 2, both the diaphragm 6 and the holder 7 move to the left, or in a direction to reduce the volume of the first space, against the resilience of the spring 10, where the permanent magnet 14 moves axially to the left while maintaining a parallel relationship with the magnetically soft member 18. The displaced position of the permanent magnet 14 is detected by an electrical processing circuit or an electronic logical processing unit.

Figure 2A:
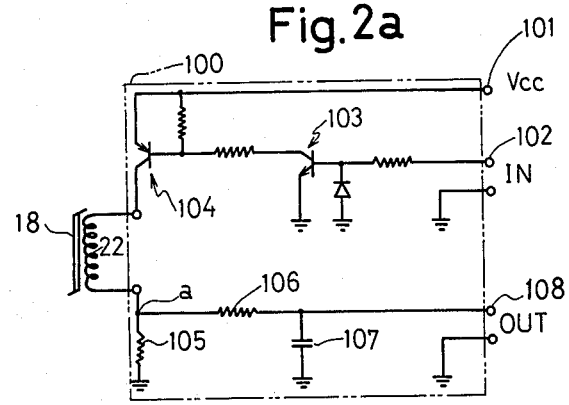
FIG. 2a is a circuit diagram of an electrical processing circuit connected to the pressure sensor shown in FIG. 1 for producing an analog voltage of a level which corresponds to the pressure detected.
Figure 2B:
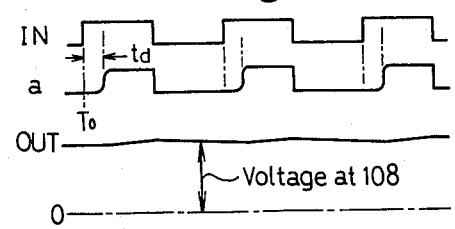

FIG. 2a shows one form of electrical processing circuit 100. The circuit 100 includes a terminal 101 adapted to be connected with, e.g., a given d.c. voltage, on the order of +5 V, for example. The circuit also includes an input terminal 102, to which a voltage pulse having a frequency on the order of 5–25 kHz, for example, is applied. An NPN transistor 103 which has its base connected to the terminal 102 is rendered conductive during the time the pulse voltage remains positive, and is rendered non-conductive when the pulse voltage assumes a ground level. A PNP transistor 104 is turned on and off when the transistor 103 is turned on and off, respectively. Hence, the supply voltage ($V_{cc}$) is applied to the electrical coil 22 during the time the voltage pulse applied to the input terminal 102 remains positive, while no voltage is applied thereto during the time the pulse voltage remains at the ground level. A voltage proportional to a current flow through the coil 22 is developed across a resistor 105, and is integrated by an integrator formed by a resistor 106 and a capacitor 107, with the integrated voltage appearing at an output terminal 108. FIG. 2b graphically shows the waveform of the input and the output voltage of the circuit shown in FIG. 2a. The time lag $t_d$ from the rising end of the input voltage (IN) until the voltage across the resistor 105 exceeds a given level, as well s the integrated voltage Vx, which represents an integral of the voltage across the resistor 105, both depend on the location of the permanent magnet 14.

Figure 3A:
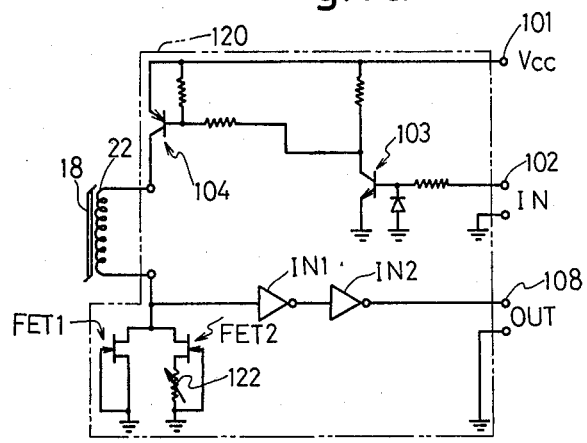
FIG. 3a is a circuit diagram of another electrical processing circuit connected to the pressure sensor shown in FIG. 1 for deriving a pulse indicative of a time lag corresponding to the pressure detected.

FIG. 3a illustrates another electrical processing circuit 120. In this instance, NPN transistor 103 and PNP transistor 104 are turned on during the time when the input voltage (IN) remains positive, thus enabling the application of constant supply voltage to the coil 22. During the time the input voltage (IN) assumes the ground level, the transistors 103 and 104 are turned off. A pair of junction N-channel field effect transistors FET 1 and FET 2 together form a constant current source and maintain a constant current flow through the coil when transistors 103 and 104 are turned on. The current level through FET 2 can be adjusted by means of a variable resistor 122. The voltage developed at the terminal of the coil which is voltage developed at the terminal of the coil which is connected to FET 1 and FET 2 is fed to a pair of cascade connected inverting amplifiers IN 1 and In 2, which amplify and shape it.

Figure 3B:
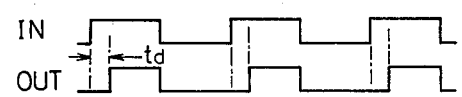

FIG. 3b graphically shows the waveform of an input and output voltage of the circuit of FIG. 3a. The circuit 102 produces an output (OUT) which is a voltage pulse which is delayed by a time lag $t_d$ with respect to an input pulse (IN), and the magnitude of time lag depends on the location of the permanent magnet 14.

Figure 4:
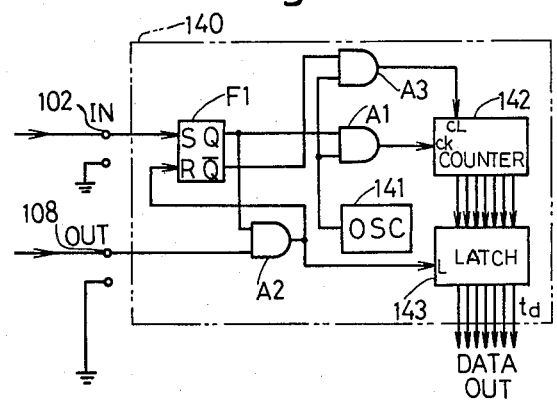
FIG. 4 is a block diagram of a counter circuit which converts a time lag between an input and an output pulse from the processing circuit of FIG. 3a into a digital code.

FIG. 4 shows a counter circuit 140 which converts the magnitude of $t_d$ into a corresponding digital code. In the circuit of FIG. 4, the rising edge of an input voltage (IN) sets a flipflop F1, whereby its Q output changes to a high level or "1", which enables an AND gate A1 to pass a pulse produced by a clock pulse oscillator 141 to a count pulse input CK of a counter 142. An output pulse (OUT) and the Q output of the flipflop F1 are applied to an AND gate A2, which produces a high level or "1" when the output pulse (OUT) rises to a high level. At this point in time, the flipflop F1 is reset, with its Q output reverting to a low level or "0". This disables the AND gate A1, and hence the supply of a clock pulse to the counter 142 is interrupted. At the time when the AND gate A2 produces a "1" output, a code indicative of the count in the counter 142 is stored in a latch 143. After the flipflop F1 is reset and the latch 143 has been loaded with the count code, an AND gate A3 passes a clock pulse to clear the counter 142. An output code from the latch 143 indicates the number of clock pulses passed during the time interval of $t_d$, and hence represents the magnitude of $t_d$.

Figure 5:
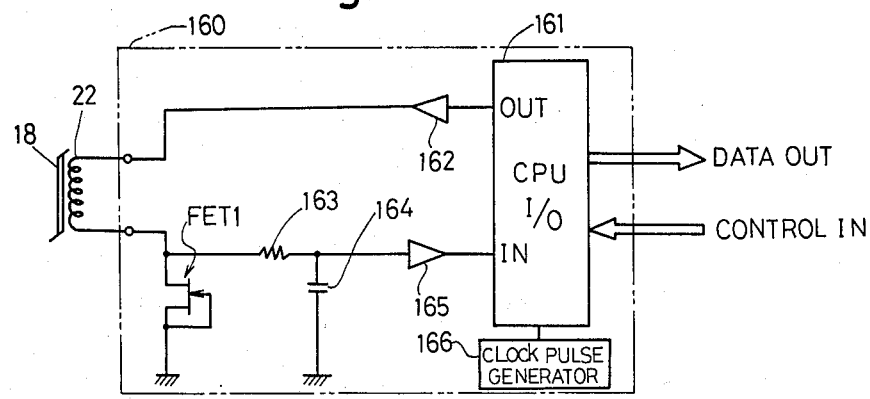
FIG. 5 is a block diagram of an electronic processing unit connected to the pressure sensor shown in FIG. 1 for determining a time lag of the rising end of a current flow through an electrical coil of the pressure sensor in response to a pulse voltage applied thereto from a single chip micro-computer.

An electronic processing unit 160 shown in FIG. 5 comprises a single chip microcomputer (a large scale integrated semiconductor unit) 161, an amplifier 162, a junction N-channel field effect transistor FET 1 which acts as a constant current source, a resistor 163, a capacitor 164, an amplifier 165 and a clock pulse oscillator 166. The combination of the resistor 163 and the capacitor 164 forms a filter which removes voltage oscillations of higher frequencies than the frequency of the input and the output pulse. The microcomputer 161 forms pulses of a given frequency in a range from 5 to 30 kHz in response to the clock pulse, and feeds it to the amplifier 162. On the other hand, the microcomputer 161 monitors the voltage developed at the junction between the N channel FET 1 and one end of the coil, or the output voltage of the amplifier 165, and counts the clock pulses which are developed during the time from the rising end of the pulse outputted by itself until the output voltage of the amplifier 165 rises to a given level. Such time interval corresponds to $t_d$, and the microcomputer forms an output code indicative of the value of $t_d$ (DATA OUT).

As discussed above, the pressure sensor 1 of FIG. 1 may be connected to a variety of electrical processing circuits or an electronic logical processing unit to provide an electrical signal indicative of the location of the permanent magnet 14 within the pressure sensor 1. The use of the pressure sensor 1 shown in FIG. 1 in combination with one of the electrical processing circuits 100, 120, 140 or the logical processing unit 160 to derive an electrical signal indicative of a hydraulic negative pressure will now be described.

Figure 6A:
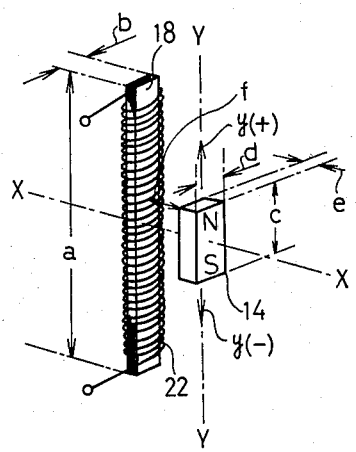
FIG. 6a is a perspective view illustrating the relative position of a magnetically soft member and a permanent magnet, which arrangement is used in determining a time lag which varies in accordance with the relative location of the permanent magnet to the magnetically soft member.

Initially, the assembly comprising the diaphragm 6, and holder 7 and the spring 10 of the pressure sensor 1 translates the negative hydraulic pressure prevailing at the inlet 2 into the location of the permanent magnet 14. The conversion of the location of the permanent magnet 14 into an electrical signal will now be described with reference to experimental data shown in FIGS. 6b to 6d. In these experiments, the inventor has fixedly mounted the magnetically soft member 18 as shown in FIG. 6a, and placed the permanent magnet 14 in parallel relationship therewith. An X—X axis is chosen so as to pass through the center of the magnetically soft member 18 in a direction perpendicular to the length thereof, which represents a Y—Y axis. The point on the permanent magnet 14 which is located on the X—X axis is chosen at the origin. Then the values of Vx and $t_d$ have been determined as a function of the travel y of the permanent magnet 14 in the Y—Y direction. The specific values of various parameters, and the material of the magnetically soft member as well as data obtained are indicated in the Table 1 below as listed in Cases No. 1 to 3.

TABLE 1

Figure 6B:
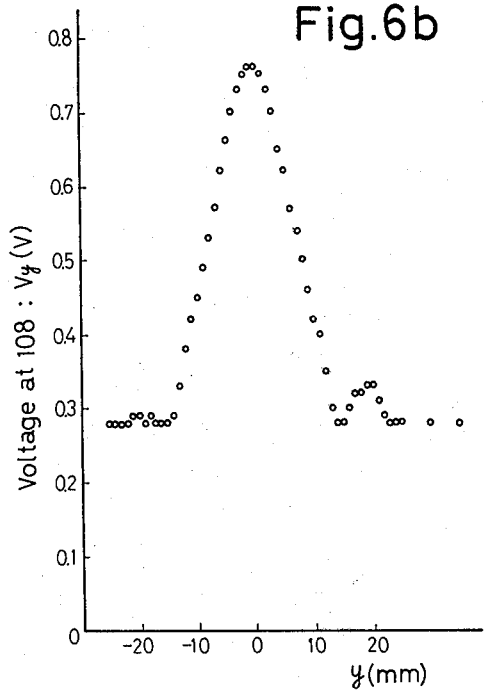
Figure 8A:
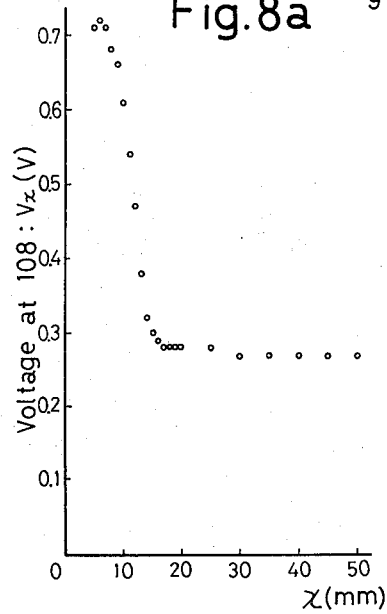
Figure 8B:
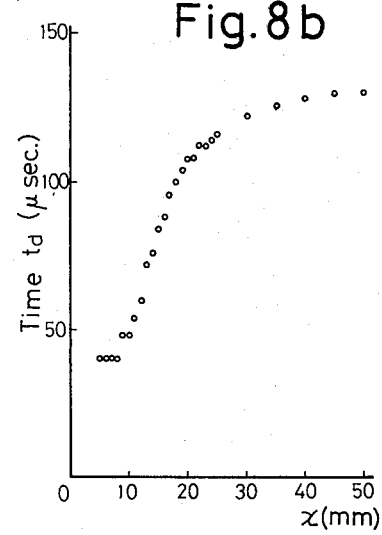
Figure 8C:
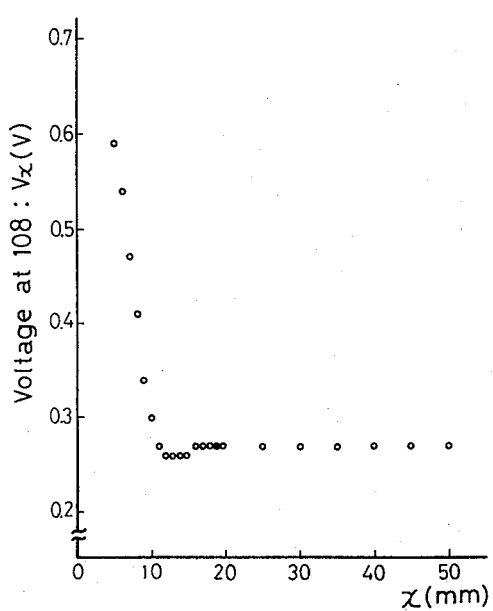
Figure 8D:
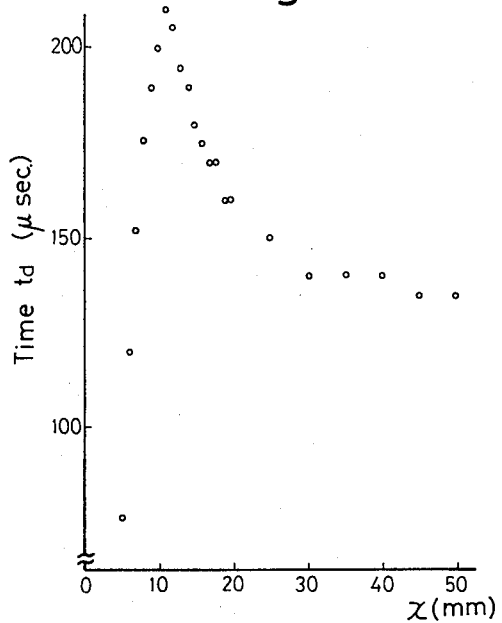
Figure 8E:
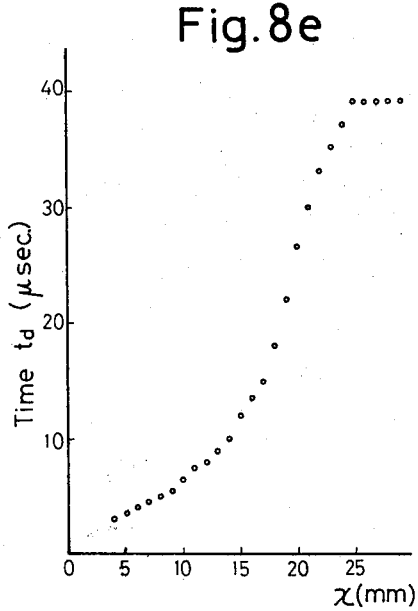
FIG. 8e is a graph illustrating data corresponding to FIG. 8a when a 30 mm long permanent magnet is employed.
Figure 8F:
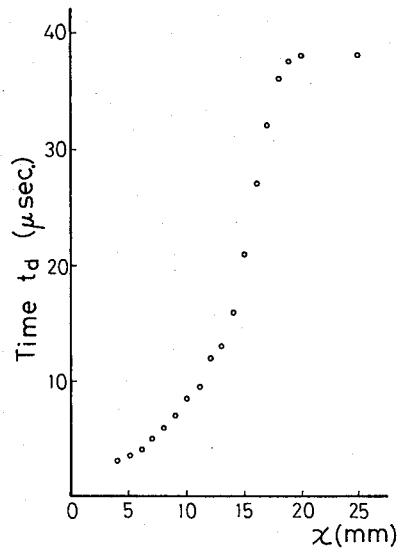
FIG. 8f is a graph illustrating data corresponding to FIG. 8b when a 30 mm long permanent magnet is employed.
Figure 15:
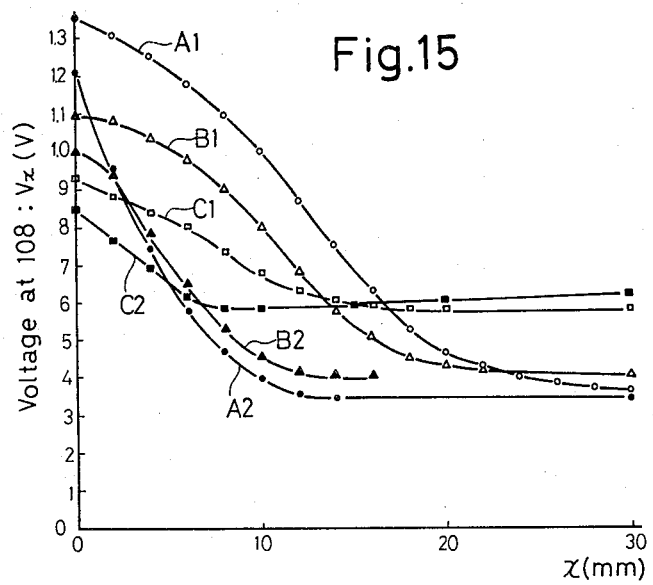
FIG. 15 is a graph illustrating the relationship between the voltage data indicative of the time lag derived from the electrical processing circuit shown in FIG. 2a and the displacement x of the permanent magnet in the X—X direction in the array shown in FIG. 6a of various magnetically soft members.

| Case No. | Magnetically soft member 18 | | | | Coil 22 | Permanent magnet 14 | | | Spacing | Measuring means and frequency of | Voltage polarity* | Data |
| | material, atomic weight percent | Thickness mm | a mm | b mm | Number of sheets | Number of turns | c mm | d mm | e mm | f mm | input pulse | | |
|---|---|---|---|---|---|---|---|---|---|---|---|---|---|
| 1 | Fe$_{40}$Ni$_{38}$Mo$_4$B$_{18}$ Amorphous | 0.050 | 40 | 1.8 | 5 | 1000 | 10 | 5 | 4 | 5 | Circuit 100 5 KHz | S—N | FIG. 6b |
| 2 | Fe$_{40}$Ni$_{38}$Mo$_4$B$_{18}$ Amorphous | " | " | " | " | " | 30 | " | " | " | Circuit 100 5 KHz | " | FIG. 6c |
| 3 | Fe$_{40}$Ni$_{38}$Mo$_4$B$_{18}$ Amorphous | " | " | " | " | " | 30 | " | " | " | Circuit 100 5 KHz | N—N | FIG. 6d |
| 4 | Fe$_{40}$Ni$_{38}$Mo$_4$B$_{18}$ Amorphous | " | " | " | " | " | 10 | " | " | x | Circuit 100 5 KHz | S—N | FIG. 8a |
| 5 | Fe$_{40}$Ni$_{38}$Mo$_4$B$_{18}$ Amorphous | " | " | " | " | " | 10 | " | " | x | Circuit 120 & Synchroscope 5 KHz | S—N | FIG. 8b |
| 6 | Fe$_{40}$Ni$_{38}$Mo$_4$B$_{18}$ Amorphous | " | " | " | " | " | 10 | " | " | x | Circuit 100 5 KHz | N—N | FIG. 8c |
| 7 | Fe$_{40}$Ni$_{38}$Mo$_4$B$_{18}$ Amorphous | " | " | " | " | " | 10 | " | " | x | Circuit 120 & Synchroscope 5 KHz | N—N | FIG. 8d |
| 8 | Fe$_{40}$Ni$_{38}$Mo$_4$B$_{18}$ Amorphous | " | " | " | " | " | 30 | " | " | x | Circuit 120 & Synchroscope 5 KHz | S—N | FIG. 8e |
| 9 | Fe$_{40}$Ni$_{38}$Mo$_4$B$_{18}$ Amorphous | " | " | " | " | " | 30 | " | " | x | Circuit 120 & Synchroscope 5 KHz | N—N | FIG. 8f |
| 14 | Fe$_{40}$Ni$_{40}$P$_{14}$B$_6$ Amorphous | 0.058 | " | " | " | " | 30 | " | " | x | Circuit 100 5 KHz | S—N | FIG. 15 A1 |
| 15 | Fe$_{40}$Ni$_{40}$P$_{14}$B$_6$ Amorphous | " | " | " | " | " | " | " | " | x | Circuit 100 5 KHz | N—N | FIG. 15 A2 |
| 16 | Ni$_{80}$Fe$_{16}$Mo$_4$ Mu-metal | 0.200 | " | 5 | 2 | " | " | " | " | x | Circuit 100 5 KHz | S—N | FIG. 15 B1 |
| 17 | Ni$_{80}$Fe$_{16}$Mo$_4$ Mu-metal | " | " | " | " | " | " | " | " | x | Circuit 100 5 KHz | N—N | FIG. 15 B2 |
| 18 | Ni$_{80}$Fe$_{20}$ | 0.100 | " | " | " | " | " | " | " | x | Circuit 100 | S—N | FIG. 15 |

TABLE 1-continued

| | Magnetically soft member 18 | | | | Coil 22 | Permanent magnet 14 | | | Spacing | Measuring means and frequency of | Voltage polarity* | |
|---|---|---|---|---|---|---|---|---|---|---|---|---|
| Case No. | material, atomic weight percent | Thickness mm | a mm | b mm | Number of sheets | Number of turns | c mm | d mm | e mm | f mm | input pulse | | Data |
| 19 | Superpermalloy Ni$_{80}$Fe$_{20}$ Superpermalloy Superpermalloy | " | " | " | " | " | " | " | " | x | 5 KHz Circuit 100 5 KHz | N—N | C1 FIG. 15 C2 |

The indication "S-N" under the column of voltage polarity means that the connection of a coil 22 with the electrical circuit 100 or 120 is such that an S-pole is produced at the upper end of the magnetically soft member 18. Similarly, the indication "N-N" means that the coil 22 is connected to the electrical circuit 100 or 120 in a manner such that an N-pole is produced at the upper end of the magnetically soft member.

In case No. 1, it is seen from data shown in FIG. 6b that a voltage Vy of a very high accuracy can be obtained for the travel y of the magnet from 0 mm to 14 mm or from −1 mm to −15 mm, or preferably from +2 mm to +12 mm or from −3 mm to −13 mm in the Y—Y axis direction. It is also seen that in Case No. 3, a voltage Vy of a high accuracy is obtained for the travel y of the magnet over an increased range. In Case No. 2, the range having a good linearity is relatively limited in extent, but the voltage is distributed in various areas of y. Hence, an operating range for the magnet 14 is chosen in the pressure sensor 1 of FIG. 1 so that the voltage Vy exhibits a good linearity with respect to the travel or location y of the magnet.

Figure 7:
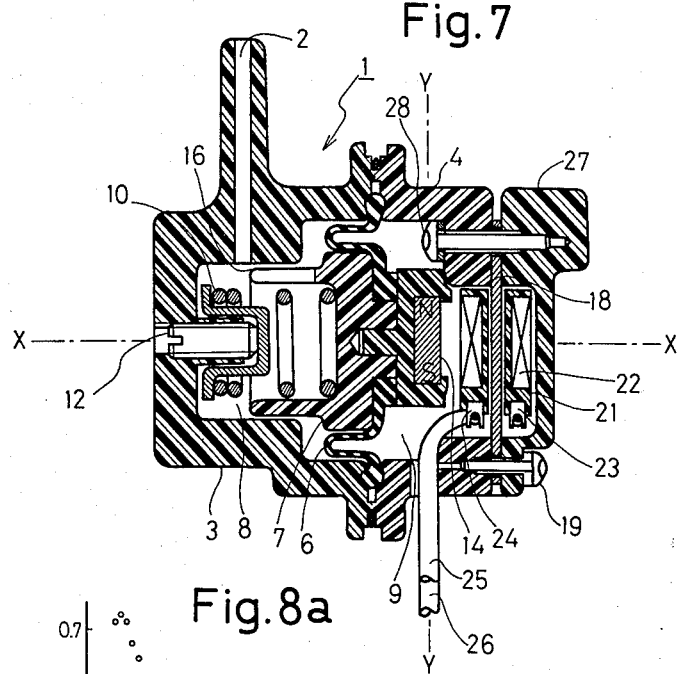
FIG. 7 is a longitudinal cross-sectional view of a pressure sensor according to another embodiment of the invention.

FIGS. 7 to 8d illustrate a second embodiment of the invention. In the pressure sensor 1 shown in FIG. 7, a permanent magnet 14 is fixedly mounted on a holder 7 with the axis of the magnet disposed in alignment with the Y—Y axis which is perpendicular to the direction of the X—X axis in which the holder 7 moves, and a magnetically soft member 18 is disposed in parallel relationship with the axis of the magnet 14. A second body 4 fixedly carries a third body 27 which is secured thereto by screws 19 and 28, whereby the opposite ends of the magnetically soft member 18 are held between the second and the third body 4, 27. In this pressure sensor, the permanent magnet 14 moves in the direction of the X—X axis shown in FIG. 6a relative to the magnetically soft member 18 as the holder 7 moves. Experimental data obtained by a movement of the permanent magnet 14 in this manner is illustrated in FIGS. 8a to 8f. Various parameters such as the configuration, the size and disposition of the associated parts utilized to obtain the data illustrated in FIGS. 8a to 8f are indicated by Cases No. 4-9 in Table 1. It will be seen from the data illustrated in FIGS. 8a to 8f that when the permanent magnet 14 is driven for movement in the direction of the X—X direction, the range of the voltage Vx or time lag $t_d$ as a function of the travel x of the magnet 14 which has a good linearity is relatively limited. However, since the magnitude of change is great in such limited range, a design can be made so that the permanent magnet 14 moves through such limited range.

FIGS. 9 to 11e illustrate a third embodiment of the invention. In the pressure sensor 1 shown in FIG. 9, a permanent magnet 14 is caused to move in the direction of the X—X axis in accordance with a negative hydraulic pressure prevailing in the inlet 2 so as to move close to or away from a magnetically soft member 18, generally in the same manner as the pressure sensor shown in FIG. 7. However, it will be noted that a separate magnetically soft member 29 is disposed in opposing relationship with the first member 18 with the permanent magnet 14 interposed therebetween. The magnetically soft member 29 extends through a coil bobbin 30 which carries an electrical coil 31 thereon.

Figure 9:
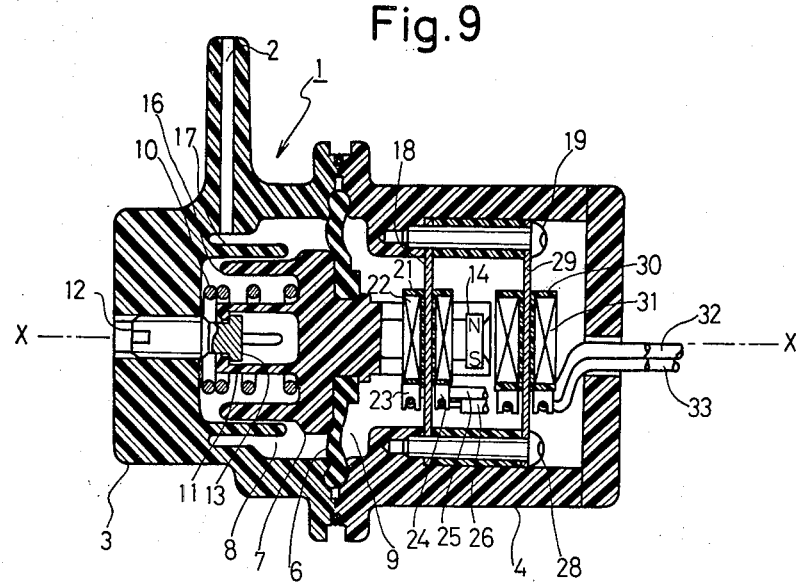
FIG. 9 is a longitudinal cross-sectional view of a pressure sensor according to a further embodiment of the invention.
Figure 10A:
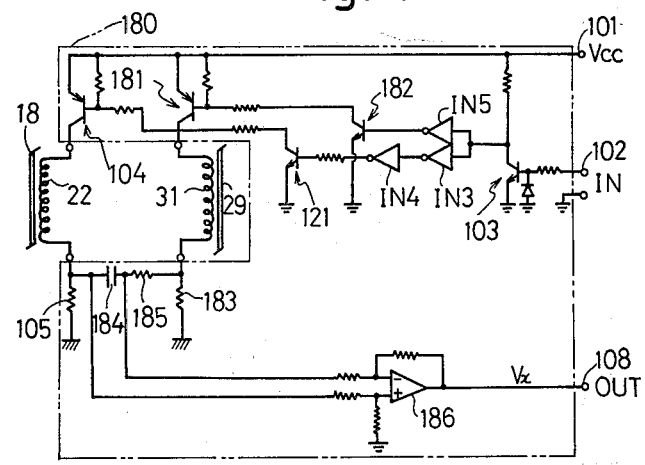
FIG. 10a is a circuit diagram of an electrical processing circuit connected to the pressure sensor shown in FIG. 9 for producing an analog voltage of a level which depends on the pressure detected.

FIG. 10a shows an electrical processing circuit 180 which produces an analog voltage Vx in accordance with the location of the permanent magnet 14 in the pressure sensor 1 shown in FIG. 9. Specifically referring to the circuit 180, an NPN transistor 103 is turned on during the time an input voltage pulse (IN) remains at its positive level, and is turned off during the time the input voltage pulse assumes a ground level. The collector voltage of the transistor 103 is amplified and shaped by a pair of inverting amplifiers IN3 and IN4 before it is applied to the base of an NPN transistor 121. Thus, when the input voltage pulse (IN) assumes its positive level, the transistor 103 is turned on while the transistor 121 is turned off. Consequently, a PNP transistor 104 is turned off during such time interval. While the transistor 103 is off, the transistor 121 is on and the transistor 104 is on during the input voltage pulse assumes the ground level. In other words, a pulse voltage is applied to the coil 22 in a similar manner as in the circuit 120 of FIG. 3a, whereby a voltage pulse appears across a resistor 105 with a time lag $t_{d1}$ from the falling end of the input voltage pulse (IN) in a manner corresponding to the distance $x_1$ of the permanent magnet 14 from the magnetically soft member 18. A constant voltage is applied to another electrical coil 31 through a PNP transistor 181. Since the transistor 103 is turned on to cause an inverting amplifier IN5 to produce a positive output which in turn turns an NPN transistor 182 on during the time the input voltage pulse (IN) assumes its positive level, the transistor 181 is also turned on, while the latter is turned off when the input voltage pulse (IN) assumes a ground level. As a result, a constant voltage is applied to the second coil when no voltage is applied to the first coil 22 while no voltage is applied to the second coil 31 when a voltage is applied to the coil 22. Stated differently, the constant voltage is applied to the first and the second coils 22, 31 in alternate fashion in accordance with the input voltage pulse (IN). The second coil 31 is connected to a resistor 183, across which a voltage pulse appears having a rising end which lags behind the rising end of the input voltage pulse (IN) by a time interval of $t_{d2}$ which depends on the distance $x_2$ of the permanent magnet 14 from the magnetically soft member 29. The voltage Vx1 developed across the resistor 105 is applied to one plate of a capacitor 184, while the voltage Vx2 developed across the resistor 183 is applied to the other plate of the capacitor 184. Since the distance between the permanent magnet 14 on one hand and the first and the second magnetically soft members 18, 29 on the other hand is represented by $x_1$ and $x_2$, respectively, with $x_1+x_2=k$ (constant), and since $V_{x1}$ and $V_{x2}$ are proportional to the magnitude of $x_1$ and $x_2$, respectively, the potential difference across the capacitor 184 corresponds to the magnitude of $(x_1-x_2)$. The capacitor 184 forms an integrator together with a resistor 185, thus producing a voltage thereacross which corresponds to the magnitude of $(x_1-x_2)$. Since $x_2=k-x_1$, $x_1-x_2=2x_1+k$. Thus, the voltage across the capacitor 184 corresponds to the magnitude of $2x_1$. That is, an analog voltage is obtained which corresponds to twice the travel $x_1$ of the permanent magnet 14 as referenced to the first magnetically soft member 18. The opposite ends of the capacitor 184 are connected to both inputs of an operational amplifier 186 which is designed as a differential amplifier. The amplifier 186 produces an analog output Vx which corresponds to $2x_1$.

Figure 10B:
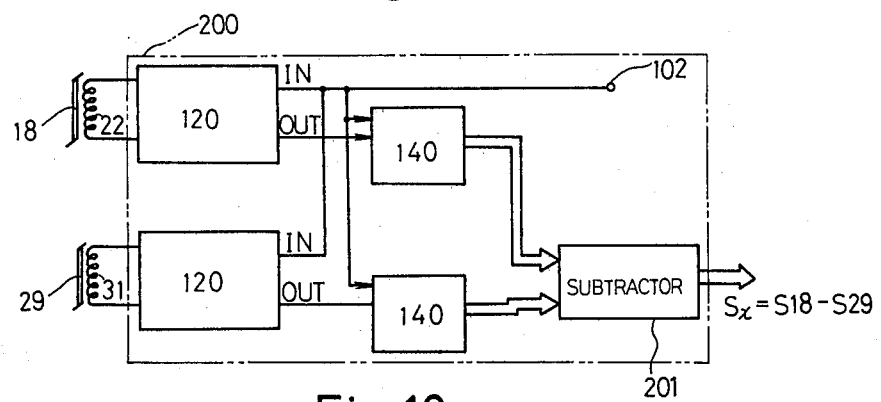
FIG. 10b is a block diagram of an electrical processing circuit connected to the pressure sensor shown in FIG. 9 for producing a digital code which represents the pressure detected.
Figure 10C:
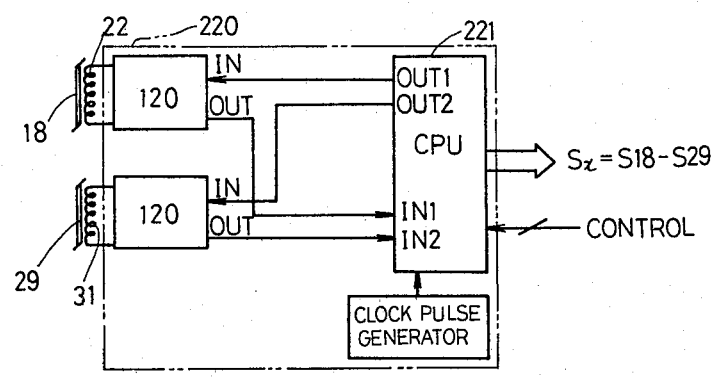
FIG. 10c is a block diagram of an electronic logical processing unit connected to the pressure sensor shown in FIG. 9 for producing a digital code indicative of the pressure detected.

FIG. 10b shows another electrical processing circuit 200 which provides a pair of pulses which lag behind the rising end of the input pulse by time intervals of $t_{d1}$ and $t_{d2}$, respectively. These pulses are applied to a pair of counter circuits 140, respectively, where they are converted into a pair of codes S18 and S29 which represent the magnitude of $t_{d1}$ and $t_{d2}$. These codes are applied to a subtractor 201, which calculates $t_{d1}-t_{d2}$, producing a digital output code $Sx=S18-S29$ which represents $t_{d1}-t_{d2}$ or $2x_1$. FIG. 10c illustrates an electronic logical processing unit 220 including a single chip microcomputer 221 which applies a single pulse to the circuit 120 connected to the electrical coil 22 while initiating a time counting operation from the rising end thereof to obtain $t_{d1}$ count data S18, which is retained. Subsequently, the microcomputer applies a single pulse to the circuit 120 connected to the electrical coil 31 while initiating the time counting operation from the rising end thereof to obtain $t_{d2}$ count data S29. Then, it calculates a difference $(t_{d1}-t_{d2})$, to produce a corresponding output code $sX=X18-S29$. As far as a measurement command signal is present, the microcomputer continues such operation.

Figure 11A:
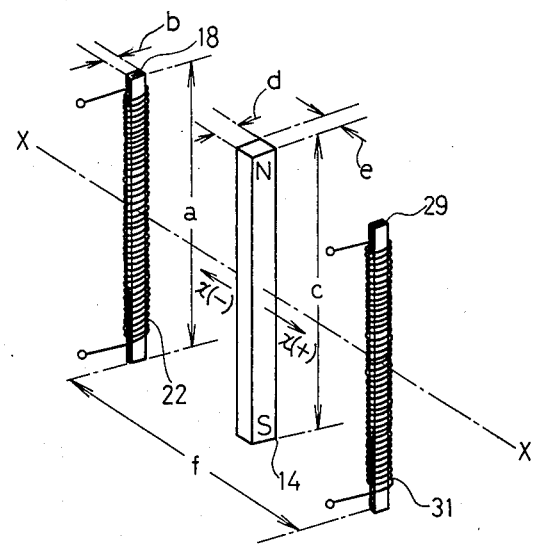
FIG. 11a is a perspective view illustrating the relative position of a pair of magnetically soft members and a permanent magnet, which arrangement is used to determine a time lag of associated electrical coils in accordance with the position of the permanent magnet relative to the members.

The inventor has determined the value of Vx as a function of the travel x of the permanent magnet 14 in the direction of the X—X axis using an arrangement as illustrated in FIG. 11a, where the magnetically soft members 18 and 19 are fixedly disposed in parallel relationship with each other with the permanent magnet 14 placed intermediate them so as to be parallel to both members 18 and 29. An axis passing through the magnet and the members 18, 29 in a direction perpendicular to their axes is chosen as the X—X axis with the origin ($x=0$) chosen at the location of the magnet 14 when it is positioned midway between the members 18, 29. Parameters a to f including the configuration and the disposition as well as the material of the magnetically soft members are indicated in the Table 2 below in correspondence to the associated measured data.

TABLE 2

Figure 11B:
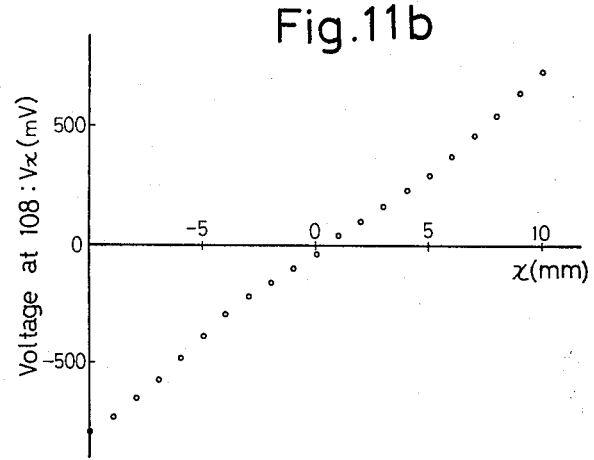
Figure 11C:
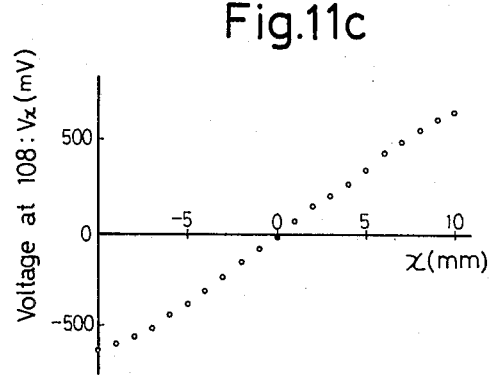
Figure 11D:
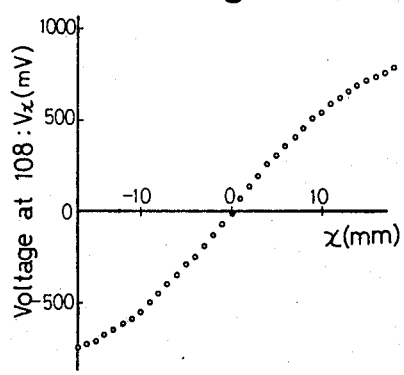
FIG. 11d is a graph illustrating data corresponding to FIG. 11b when the electrical coils are spaced apart by a distance of 50 mm.
Figure 11E:
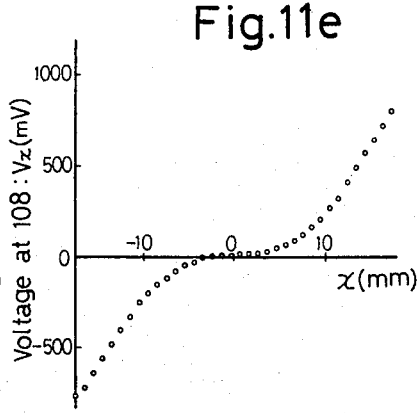
FIG. 11e is a graph illustrating data corresponding to FIG. 11c when the electrical coils are spaced apart by a distance of 50 mm.

| Case No. | Magnetically soft member 18, 20 material, atomic weight percent | Thickness mm | a mm | b mm | Number of sheets | Coil 22, 31 Number of turns | Permanent magnet 14 c mm | d mm | e mm | Spacing f mm | Measuring means and frequency of input pulse | Voltage polarity | Data |
|---|---|---|---|---|---|---|---|---|---|---|---|---|---|
| 10 | Fe$_{40}$Ni$_{40}$Mo$_2$B$_{18}$ Amorphous | 0.05 | 30 | 1.8 | 4 | 1000 | 30 | 5 | 4 | 35 | Circuit 180 5 KHz | S—N | FIG. 11b |
| 11 | Fe$_{40}$Ni$_{40}$Mo$_2$B$_{18}$ Amorphous | " | " | " | " | " | " | " | " | 35 | Circuit 180 5 KHz | N—N | FIG. 11c |
| 12 | Fe$_{40}$Ni$_{40}$Mo$_2$B$_{18}$ Amorphous | " | " | " | " | " | " | " | " | 50 | Circuit 180 5 KHz | S—N | FIG. 11d |
| 13 | Fe$_{40}$Ni$_{40}$Mo$_2$B$_{18}$ Amorphous | " | " | " | " | " | " | " | " | 50 | Circuit 180 5 KHz | N—N | FIG. 11e |

When the distance between the magnetically soft members 18 and 29 is small, a Vx—x response having a good linearity with respect to the distance is obtained in a range of $-10\ mm<x<10\ mm$, as indicated in FIGS. 11b and 11c. For an increased distance f between the members 18 and 29, a relatively good linearity is achieved in a range of $-9\ mm<x<9\ mm$ in an S-N mode as illustrated in FIG. 11d, but the extent over which the good linearity is achieved is narrower than that obtained with a reduced value of f. Also, the linearity is degraded as compared with that obtained with a smaller value of f. As shown in FIG. 11e, the linearity is very poor in a region adjacent to the origin ($x=0$) in an N-N mode while the linearity is improved when one of the magnetically soft members is approached, the linearity becoming very close to that of Cases No. 4-9. This is because the magnetic field which the permanent magnet 14 exerts upon the magnetically soft members 18 and 29 is reduced when the magnet is located adjacent to the origin. Thus, since the V(x—x) response depends not only on the distance f between the magnetically soft members 18 and 29 but also on the configuration of the permanent magnet 14 and the field strength produced thereby, a desired response can be obtained in a relatively simple manner.

Figure 12:
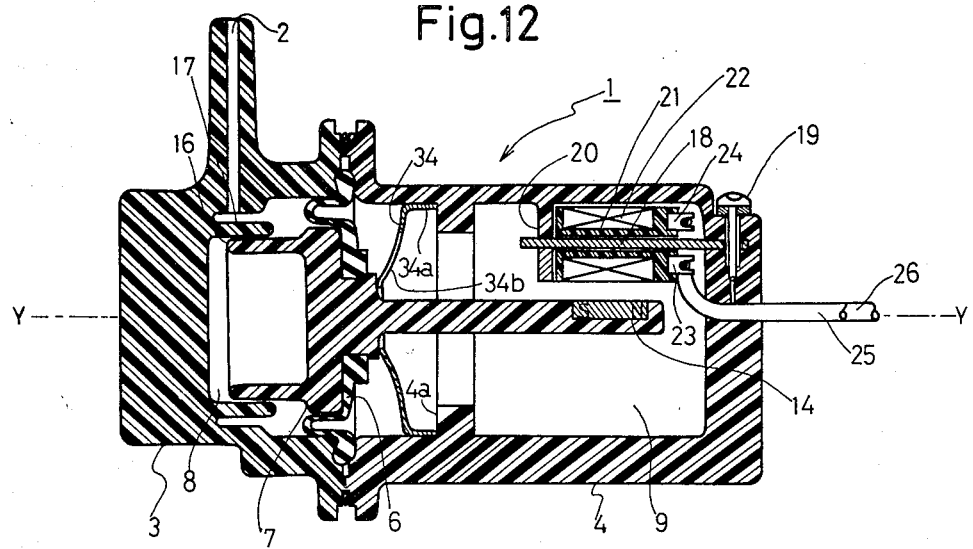
FIG. 12 is a longitudinal cross-sectional view of a pressure sensor according to still another embodiment of the invention, which is a modification of the pressure sensor of FIG. 1 so as to be capable of detecting a positive pressure.

FIGS. 12 to 15 illustrate other embodiments of the invention. While the described embodiments are arranged to detect a negative hydraulic pressure, the invention is equally applicable to detect a positive hydraulic pressure. FIG. 12 illustrates a modification of the pressure sensor shown in FIG. 1 in that it may be formed as a positive pressure sensor. In FIG. 12, a leaf spring 34 which is frusto-conical in cross section and having an annular leg 34a and a plurality of tongue-shaped spring arms 34b which are contiguous with the leg 34a is disposed in a second inner space 9, with the leg 34a being secured to a second body 4. The free end of the spring arms 34b bears against a holder 7, thus urging it to the left. A fluid of a positive pressure which is to be determined is supplied into an inlet 2.

Figure 13:
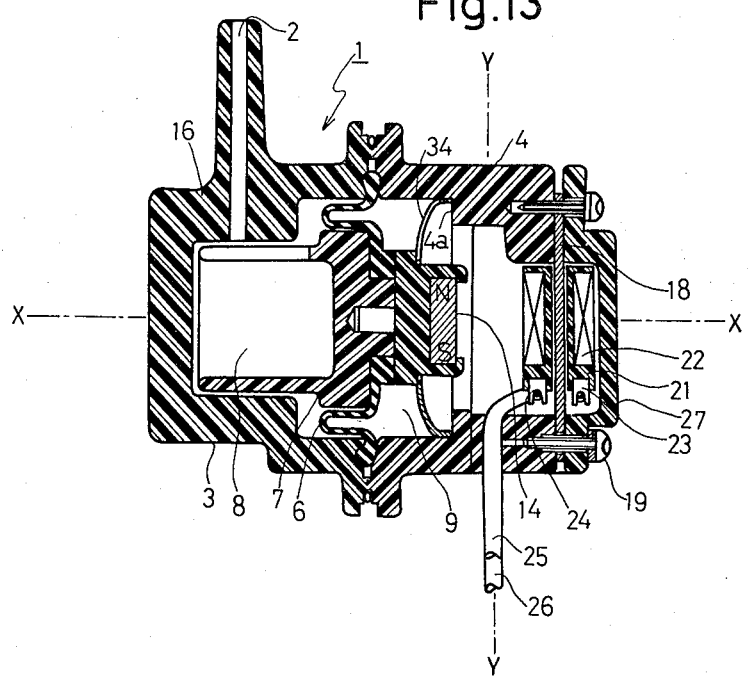
FIG. 13 is a longitudinal cross-sectional view of a still further embodiment of the invention, which is a modification of the sensor shown in FIG. 7 so as to be capable of detecting a positive pressure.
Figure 14:
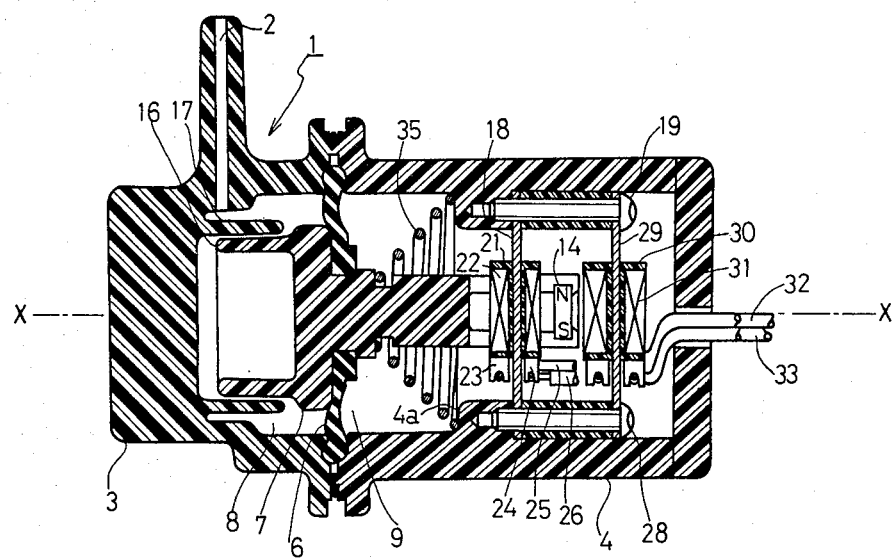
FIG. 14 is a longitudinal cross-sectional view of a sensor according to yet another embodiment of the invention which is a modification of the sensor shown in FIG. 9 so as to be capable of detecting a positive pressure.

FIG. 13 illustrates a positive pressure sensor which is a modification of the negative pressure sensor shown in FIG. 7. Again, a leaf spring 34 is disposed in a second inner space 9, urging a holder 7 to the left. FIG. 14 shows a positive pressure sensor which is a modification of the negative pressure sensor shown in FIG. 9. In this instance, a coiled compression spring 35 is disposed in a second inner space 9, urging a holder 7 to the left.

In the described embodiments and modifications, each of the magnetically soft members 18 and 29 comprises a plurality of sheets of an amorphous magnetic material which exhibits a high resilience and a high resistance to deformation. However, other magnetic materials may be used for the magnetically soft members 18 and 29 in carrying out the invention. FIG. 15 graphically illustrates the V (x—x) data, representing a comparison between the use of an amorphous magnetic material and other magnetic materials. To obtain these data, the magnetically soft member and the permanent magnet are arranged as shown in FIG. 6a and the permanent magnet is driven in the direction of the X—X axis. Various parameters such as the configuration and the disposition of the parts are indicated in Table 1 as Cases No. 14-19. Curves A1-C2 of FIG. 15 demonstrate that either magnetically soft member exhibits a high linearity in the V (x—x) response over a range of at least 6 mm (for example, from x=10 mm to x=16 mm for curve $A_1$ and from x=8 to x=14 mm for curve B1), and hence can be used in the pressure sensor of the invention. A magnetically soft member formed of an amorphous material is preferably used for applications which require a high resistance to oscillations and to deformation.

It will be apparent from the above description of several embodiments and demonstration of experimental data that the pressure sensor of the invention does not employ a sliding contact, but converts a displacement of a movable member which responds to the application of a hydraulic pressure into a time lag $t_d$ between an input pulse to an electrical coil and a current pulse through the coil. The time lag $t_d$ is then converted into an analog voltage or time count code. In this manner, a pressure detection signal is obtained through electrical processing, so that it is highly immune to the influence of oscillations and is less susceptible to degradation such as may be caused by mechanical abrasion. Since there is no connection mechanism between the movable body and its associated transducer, there is produced no rattling, in achieving a pressure detection in a stabilized manner. What is more important, the arrangement of the electrical processing circuit connected to the sensor is simple. In particular, a large scale semiconductor unit such as a single chip microcomputer may be used to produce a detection pulse and to derive a time lag between the pulse and a current pulse through the electrical coil in the form of a digital code.

Having now fully set forth both the structure and operation of preferred embodiments of the concept underlying the present invention, various other embodiments as well as certain variations and modifications of the embodiments herein shown and described will obviously occur to those skilled in the art. For example, instead of forming a movable body by a combination of a diaphragm and a holder as illustrated in the embodiments, a piston or a combination of a piston with a holder may be used.

Obviously, numerous additional modifications and variations of the present invention are possible in light of the above teachings. It is therefore to be understood that within the scope of the appended Claims, the invention may be practiced otherwise than as specifically described herein.

What is claimed as new and desired to be secured by Letter Patent of the United States is:

1. A pressure sensor comprising;
    a casing defining an inner space;
    a movable body dividing said inner space of said casing into a first space and a second space and movable within said inner space in response to pressure differential generated between said first and second spaces;
    a fluid port communicating with the first space;
    spring means for urging the movable body in a given direction to reduce the volume of the first space or to reduce the volume of the second space;
    a permanent magnetic coupled to the movable body and movable therewith;
    a core formed of at least one member consisting of a magnetically soft material magnetically coupled to said permanent magnet and disposed adjacent to a range of movement of the permanent magnet;
    an electricl coil disposed on the at least one member of said core;
    means for applying an electrical signal to said coil to saturate magnetically said core; and
    means for producing a pressure output signal indicative of the pressure differential between said first and second spaces based on the amount of time between application of said electrical signal and saturation of said core.

2. A pressure sensor according to claim 1 in which the movable body comprises:
    a diaphragm, and
    a holder which is secured thereto, the permanent magnet being fixedly mounted on the holder.

3. A pressure sensor according to claim 1 in which the spring means comprises:
    a coiled compression spring disposed within the first space.

4. A pressure sensor according to claim 1 in which the spring means comprises:
    a leaf spring disposed in the second space.

5. A pressure sensor according to claim 1 in which the spring means comprises:
    a coiled compression spring disposed within the second space.

6. A pressure sensor according to claim 1 in which the core comprises:
    an amorphous magnetic material.

7. A pressure sensor according to claim 1, further comprising:
    said permanent magnet lengthwise magnetized and fixedly mounted on the movable body with its length aligned with the direction of movement of the movable body; and
    the core disposed with its length extending parallel to the direction of movement of the movable body.

8. A pressure sensor according to claim 1, further comprising:
    the permanent magnet lengthwise magnetized and fixedly mounted on the movable body with its length extending perpendicular to the direction of movement of the movable body; and
    the core disposed with its length extending perpendicular to the direction of movement of the movable body.

9. A pressure sensor according to claim 1, further comprising:
    the permanent magnet lengthwise magnetized and fixedly mounted on the movable body with its length extending in a direction perpendicular to the direction of movement of the movable body;

the core comprising a pair of magnetically soft members disposed in opposing relationship with each other with the permanent magnet interposed therebetween; and each of the magnetically soft members of said core having an electrical coil disposed on the respective magnetically soft member.

10. A pressure sensor comprising:

first and second casing members;

a diaphragm having a periphery held between the first and the second casing members and dividing the internal space enclosed by the first and the second casing members into first and second inner spaces;

a fluid port communicating with the first inner space;

a holder fixedly mounted centrally on the diaphragm and including a rod portion which projects into the second inner space;

a permanent magnet fixedly mounted on the rod portion of the holder;

a core formed of at least one member including a magnetically soft material disposed within the second inner space and fixedly mounted on the second casing member;

an electrical coil disposed on the at least one member of said core;

a coiled compression spring disposed within the first inner space for urging the holder in a direction to reduce the volume of the second inner space;

said diaphragm being movable within said inner space in response to a pressure difference generated between said first and second inner spaces, the movement of said diaphragm altering the magnetic coupling between said magnet and said core;

means for applying an electrical signal to said coil to saturate magnetically said core; and means for producing a pressure output signal indicative of the pressure differential between the first and second inner spaces based on the amount of time between application of said electrical signal and saturation of said core.

11. A pressure sensor comprising:

a first and a second casing member;

a diaphragm having a periphery held between the first and the second casing member and dividing an internal space enclosed by the first and the second casing member into a first and a second inner space;

a fluid port communicating with the first inner space;

a holder fixedly mounted centrally on the diaphragm and including at least a rod portion which projects into the second inner space;

a permanent magnet fixedly mounted on the rod portion of the holder;

a core formed of at least one member consisting of a magnetically soft material disposed within the second inner space and fixedly mounted on the second casing member;

an electrical coil disposed on the at least one member of saic core;

spring means disposed within the second inner space for urging the holder in a direction to reduce the volume of the first inner space;

said diaphragm being movable within said inner space in response to a pressure difference generated between said first and second inner spaces, the movement of said diaphragm altering the magnet coupling between said magnet and said core;

means for applying an electrical signal to said coil to magnetically saturate said core; and means for producing a pressure output signal indicative of the pressure differential between said first inner space and said second inner space based on the amount of time between application of said electrical signal and saturation of said core.

12. A pressure sensor according to claim 11 in which the spring means comprises:

a leaf spring.

13. A pressure sensor according to claim 11 in which the spring means comprises:

a coiled compression spring.

* * * * *